United States Patent
Iwakiri

(10) Patent No.: US 9,391,335 B2
(45) Date of Patent: Jul. 12, 2016

(54) SOLID OXIDE FUEL CELL SYSTEM AND METHOD FOR CONTROLLING SAME

(71) Applicant: NISSAN MOTOR CO., LTD., Yokohama-shi, Kanagawa (JP)

(72) Inventor: Yasunori Iwakiri, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/409,052

(22) PCT Filed: Apr. 23, 2013

(86) PCT No.: PCT/JP2013/061912
§ 371 (c)(1),
(2) Date: Dec. 18, 2014

(87) PCT Pub. No.: WO2013/190900
PCT Pub. Date: Dec. 27, 2013

(65) Prior Publication Data
US 2015/0188174 A1    Jul. 2, 2015

(30) Foreign Application Priority Data

Jun. 19, 2012    (JP) .................................. 2012-137589

(51) Int. Cl.
*H01M 8/06* (2016.01)
*H01M 8/12* (2016.01)
*H01M 8/04* (2016.01)

(52) U.S. Cl.
CPC ........ *H01M 8/0618* (2013.01); *H01M 8/04231* (2013.01); *H01M 8/04268* (2013.01); *H01M 8/04455* (2013.01); *H01M 8/04753* (2013.01); *H01M 8/04776* (2013.01); *H01M 8/0612* (2013.01); *H01M 8/0625* (2013.01); *H01M 8/1206* (2013.01); *H01M 2008/1293* (2013.01); *H01M 2250/20* (2013.01); *H01M 2300/0074* (2013.01); *Y02E 60/521* (2013.01); *Y02E 60/525* (2013.01); *Y02T 90/32* (2013.01)

(58) Field of Classification Search
CPC ............ H01M 8/0612; H01M 8/0625; H01M 8/1206; H01M 8/04268; H01M 8/04455; H01M 8/04753; H01M 8/04776; H01M 8/04231; H01M 8/0618; H01M 2008/1293; H01M 2250/20; H01M 2300/0074; Y02E 60/521; Y02E 60/525; Y02T 90/32
See application file for complete search history.

(56) References Cited

U.S. PATENT DOCUMENTS

| | | | | |
|---|---|---|---|---|
| 6,309,770 | B1 * | 10/2001 | Nagayasu | ......... H01M 8/04097 429/415 |
| 2003/0072978 | A1 * | 4/2003 | Meyer | ............... H01M 8/04231 429/420 |
| 2005/0089731 | A1 | 4/2005 | Ogiwara et al. | |
| 2007/0099040 | A1 * | 5/2007 | Morita | .............. H01M 8/04231 429/429 |
| 2009/0047554 | A1 * | 2/2009 | Kanao | ..................... C01B 3/384 429/424 |

FOREIGN PATENT DOCUMENTS

| | | |
|---|---|---|
| JP | 01195671 A | 8/1989 |
| JP | H0293207 A | 4/1990 |
| JP | 09223511 A | 8/1997 |
| JP | 09231989 A | 9/1997 |
| JP | 2003059519 A | 2/2003 |
| JP | 2003229164 A | 8/2003 |
| JP | 2005179081 A | 7/2005 |
| JP | 2006156088 A | 6/2006 |
| JP | 2006210019 A | 8/2006 |
| JP | 2007106612 A | 4/2007 |
| JP | 2008243633 A | 10/2008 |
| JP | 2011165498 A | 8/2011 |

* cited by examiner

*Primary Examiner* — Muhammad Siddiquee
(74) *Attorney, Agent, or Firm* — Young Basile Hanlon & MacFarlane, P.C.

(57) ABSTRACT

A solid oxide fuel cell system includes: a fuel cell stack having a fuel electrode and an oxidant electrode; and a combustion unit provided to start the system; a control unit configured to perform control in such a way as to fill a combustion gas discharged from the combustion unit into the fuel electrode of the fuel cell stack at a time of stopping the system, the combustion gas containing an inert gas as a component.

4 Claims, 7 Drawing Sheets

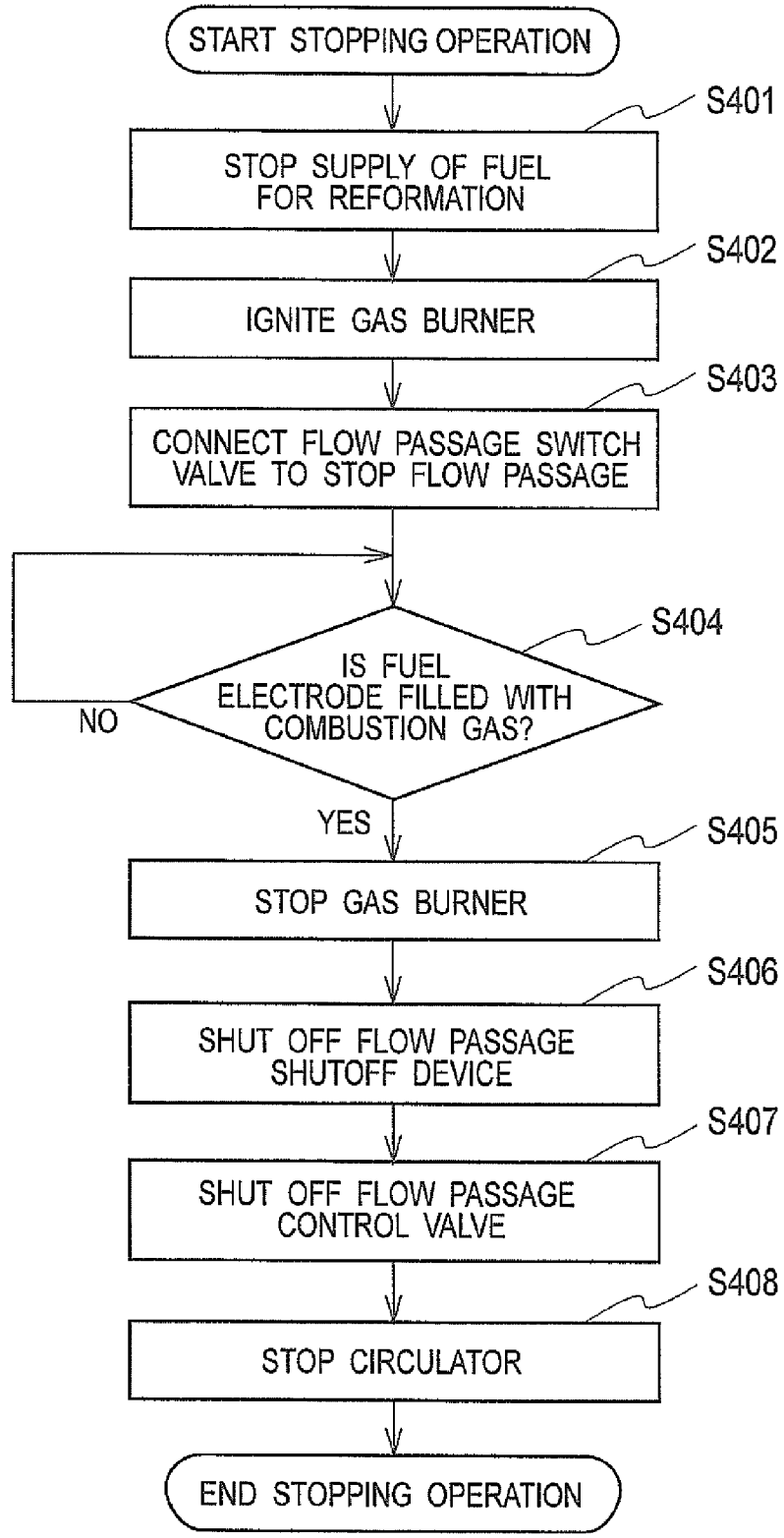

SOLID OXIDE FUEL CELL SYSTEM AND METHOD FOR CONTROLLING SAME

CROSS REFERENCE TO RELATED APPLICATION

The present application claims priority to Japanese Patent Application No. 2012-137589, filed Jun. 19, 2012, incorporated herein in its entirety.

TECHNICAL FIELD

The present invention relates to a fuel cell system using a solid oxide fuel cell (SOFC), and a method for controlling the same.

BACKGROUND

Applications of various fuel cells to automobiles have been studied in recent years along with an increased interest in global warming issues. In the case of a highly efficient solid oxide fuel cell, for example, power is generated by electrochemical reaction of oxygen with hydrogen, carbon monoxide, and other hydrocarbons by using: a gas containing a large amount of hydrogen as a fuel; and oxygen as an oxidant. In some cases, such fuels are obtained by a method of reforming various liquid fuels and supplying reformed gases thus obtained.

Here, one particularity of using a solid oxide fuel cell (SOFC) for an automobile is that the SOFC is frequently started and stopped unlike a stationary cell. Supply of a raw material gas is stopped in the first place in the case of stopping the SOFC. As a consequence, a hydrogen-rich gas remains inside piping extending from a reformer to an anode of the fuel cell as well as an anode exhaust gas pipe.

At this time, if external air enters the cell due to a drop in temperature of the cell which leads to a negative pressure inside the cell, or due to diffusion of the gas during storage, there are risks of rapid combustion attributed to reaction of oxygen contained in the external air with the remaining hydrogen, induction of degradation in performance attributed to oxidation of an electrode catalyst, and the like. Such a fuel cell therefore has a problem of a difficulty in maintaining a stable performance if the fuel cell frequently repeats starting, stopping, and storing operations.

Accordingly, at the time of stopping a fuel cell system, it is necessary to prevent entry of oxygen by supplying an inert gas as typified by nitrogen in order to protect a catalyst located in a hydrogen generator and to protect electrodes of a fuel cell. For example, Japanese Patent Application Publication No. 2005-179081 discloses a method for supplying an inert gas into a fuel cell system by: providing an oxygen remover in a flow passage opened to the atmosphere; and supplying a fuel cell with a gas which is prepared by removing oxygen from the atmosphere.

SUMMARY

However, in the technique disclosed in Japanese Patent Application Publication No. 2005-179081, the inert gas is supplied into the fuel cell system by providing the oxygen remover and modifying the piping. Accordingly, numerous special devices and piping systems need to be provided solely for the stopping operation, and this technique has a problem of an increase in costs due to the additionally-provided devices. This problem needs to be solved since the installation of the system in an automobile leads to a disadvantage to cost competitiveness.

The present invention has been made in view of the aforementioned circumstances. An object of the invention is to provide a solid oxide fuel cell system and a method for controlling the same, which are capable of filling an inert gas into a fuel cell and preventing entry of oxygen just by providing a small number of devices in addition to devices used for power generation at normal times.

A solid oxide fuel cell system of a first aspect of the present invention includes: a fuel cell stack including a fuel electrode and an oxidant electrode; a combustion unit provided to start the system; and a control unit configured to perform control in such a way as to fill a combustion gas discharged from the combustion unit into the fuel electrode of the fuel cell stack at the time of stopping the system, the combustion gas containing an inert gas as a component.

A method for controlling a solid oxide fuel cell system of a second aspect of the present invention is a method for controlling a solid oxide fuel cell system including: a fuel cell stack having a fuel electrode and an oxidant electrode; and a combustion unit provided to start the system, the method including filling a combustion gas discharged from the combustion unit into the fuel electrode of the fuel cell stack at the time of stopping the system, the combustion gas containing an inert gas as a component.

BRIEF DESCRIPTION OF DRAWINGS

FIG. 7 is a flowchart showing an example of procedures for control processing at the time of stopping the system of the solid oxide fuel cell system 51 shown in FIG. 5.

DESCRIPTION OF EMBODIMENTS

Figure 1:
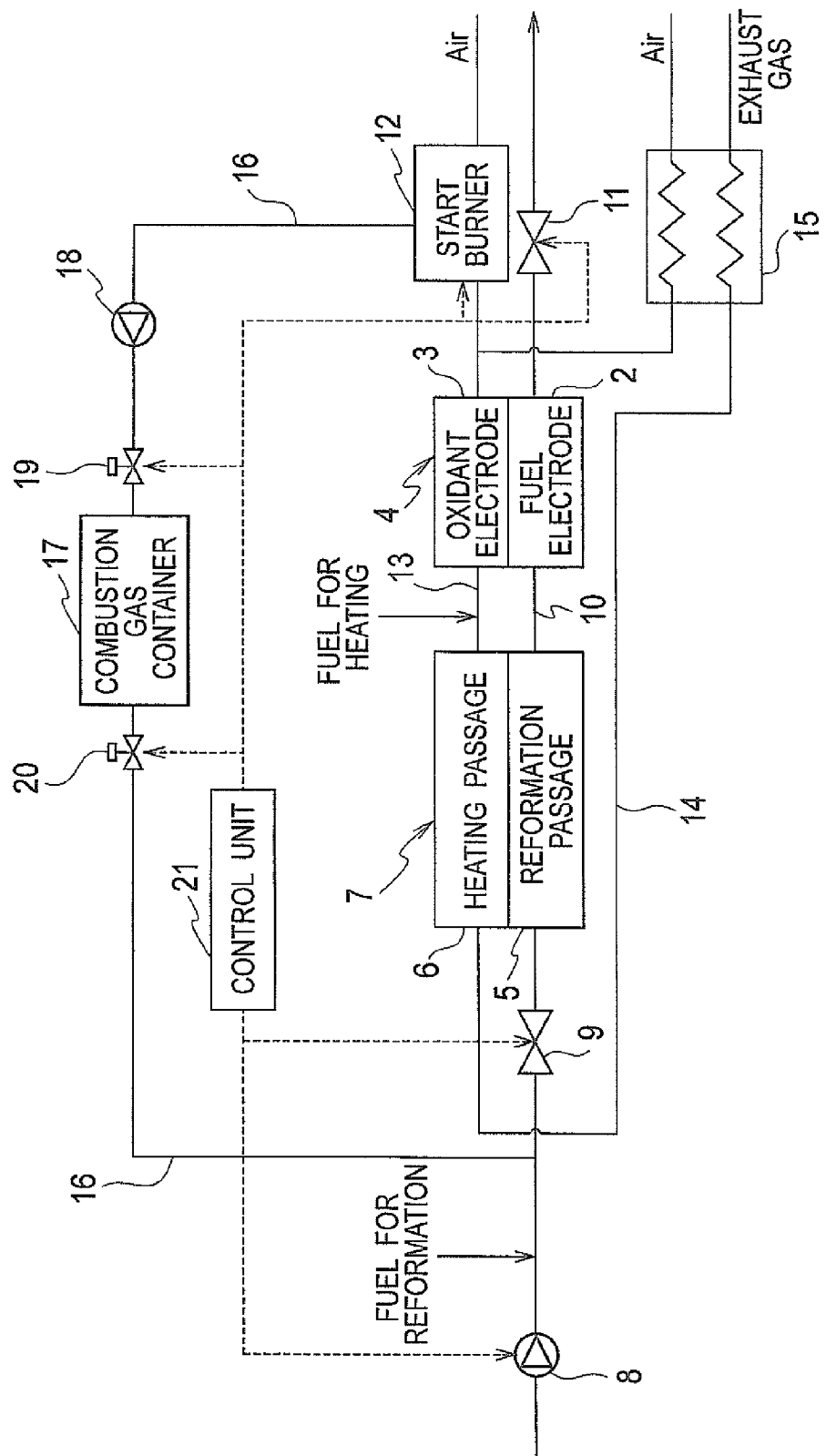
FIG. 1 is a block diagram showing a configuration of a solid oxide fuel cell system 1 according to a first embodiment applying the present invention.

First and second embodiments applying the present invention will be described below with reference to the drawings.

First Embodiment

[Configuration of Solid Oxide Fuel Cell System] A configuration of a solid oxide fuel cell system of this embodiment will be described with reference to FIG. 1. A solid oxide fuel cell system 1 of the embodiment includes: a fuel cell stack 4 provided with a fuel electrode 2 and an oxidant electrode 3; a reformer 7 provided with a reformation passage 5 and a heating passage 6; an air supply device 8 configured to supply air to be mixed with a fuel for reformation; a flow passage shutoff device 9 configured to shut off a passage to the reformation passage 5 of the reformer 7; a fuel electrode flow passage 10 configured to supply a reformed gas from the reformation passage 5 to the fuel electrode 2; a flow passage control valve 11 configured to control a flow rate of a fuel electrode exhaust gas discharged from the fuel electrode 2; a start burner 12 configured to supply a combustion gas at the time of the start and thereby to heat the oxidant electrode 3; an oxidant electrode flow passage 13 configured to supply an oxidant electrode exhaust gas discharged from the oxidant electrode 3 to the heating passage 6; an exhaust flow passage 14 configured to discharge an exhaust gas from the heating passage 6 to the atmosphere; an air preheater 15 configured to heat air to be supplied to the oxidant electrode 3 by exchanging heat with the exhaust gas; a combustion gas flow passage 16 configured to supply part of the combustion gas discharged from the start burner 12 to the fuel electrode 2; a combustion gas container 17 disposed in the middle of the combustion gas flow passage 16 and configured to contain the combustion gas; a gas pressurizing pump 18 configured to pressurize and deliver the combustion gas to the combustion gas container 17; an inlet flow passage valve 19 configured to open and close an inlet side of the combustion gas container 17; an outlet flow passage valve 20 configured to open and close an outlet side of the combustion gas container 17; and a control unit 21 configured to control processing in the solid oxide fuel cell system 1.

Here, the fuel cell stack 4 is a solid oxide fuel cell (SOFC), which includes: the fuel electrode 2 to which the reformed gas is supplied as a fuel gas from the reformer 7; and the oxidant electrode 3 to which the air containing oxygen is supplied as an oxidant gas. The fuel cell stack 4 generates power by bringing hydrogen contained in the reformed gas and oxygen contained in the oxidant gas into reaction.

The reformer 7 generates a hydrogen-containing reformed gas by reforming a fuel for reformation such as natural gas, gasoline, and methanol. In the reformation passage 5, the fuel for reformation supplied together with the air is brought into reaction by using heat from the heating passage 6, and the reformed gas is thereby generated. In the heating passage 6, the oxidant electrode exhaust gas discharged from the oxidant electrode 3 and a fuel for heating are supplied thereto, then reaction heat is generated with the assistance of a heating catalyst, and the heat is transferred to the reformation passage 5.

The start burner 12 is a combustion unit provided for starting the system, which has heretofore been installed to be operated at the time of starting the system in order to supply the high-temperature combustion gas to the oxidant electrode 3 and to raise the temperature of the fuel cell stack 4. In the embodiment, however, the start burner 12 is configured to be capable of supplying part of the combustion gas discharged therefrom to the combustion gas flow passage 16.

The combustion gas flow passage 16 is a flow passage configured to supply the combustion gas discharged from the start burner 12 to the fuel electrode 2 of the fuel cell stack 4. In FIG. 1, the combustion gas flow passage 16 is connected between the air supply device 8 and the flow passage shutoff device 9.

The combustion gas container 17 is disposed in the middle of the combustion gas flow passage 16 and is configured to contain part of the combustion gas discharged from the start burner 12 at the time of the start. A capacity of the combustion gas container 17 is preset such that the combustion gas container 17 can contain a sufficient amount of the combustion gas for filling a space defined by the reformation passage 5, the fuel electrode flow passage 10 and the fuel electrode 2 between the flow passage shutoff device 9 and the flow passage control valve 11 with the combustion gas at a pressure equal to or above a predetermined value. In the meantime, entry and exit of the combustion gas to and from the combustion gas container 17 is controlled by opening and closing the inlet flow passage valve 19 and the outlet flow passage valve 20.

The gas pressurizing pump 18 is installed in order to cause the combustion gas container 17 to contain the sufficient amount of the combustion gas by pressurizing and delivering the combustion gas discharged from the start burner 12.

The control unit 21 is formed from a general-purpose electronic circuit such as a microcomputer, a microprocessor or a CPU, and from peripherals. The control unit 21 executes processing for controlling the solid oxide fuel cell system 1 by executing a specific program.

Now, a structure of the start burner 12 will be described with reference to FIG. 2.

Figure 2:
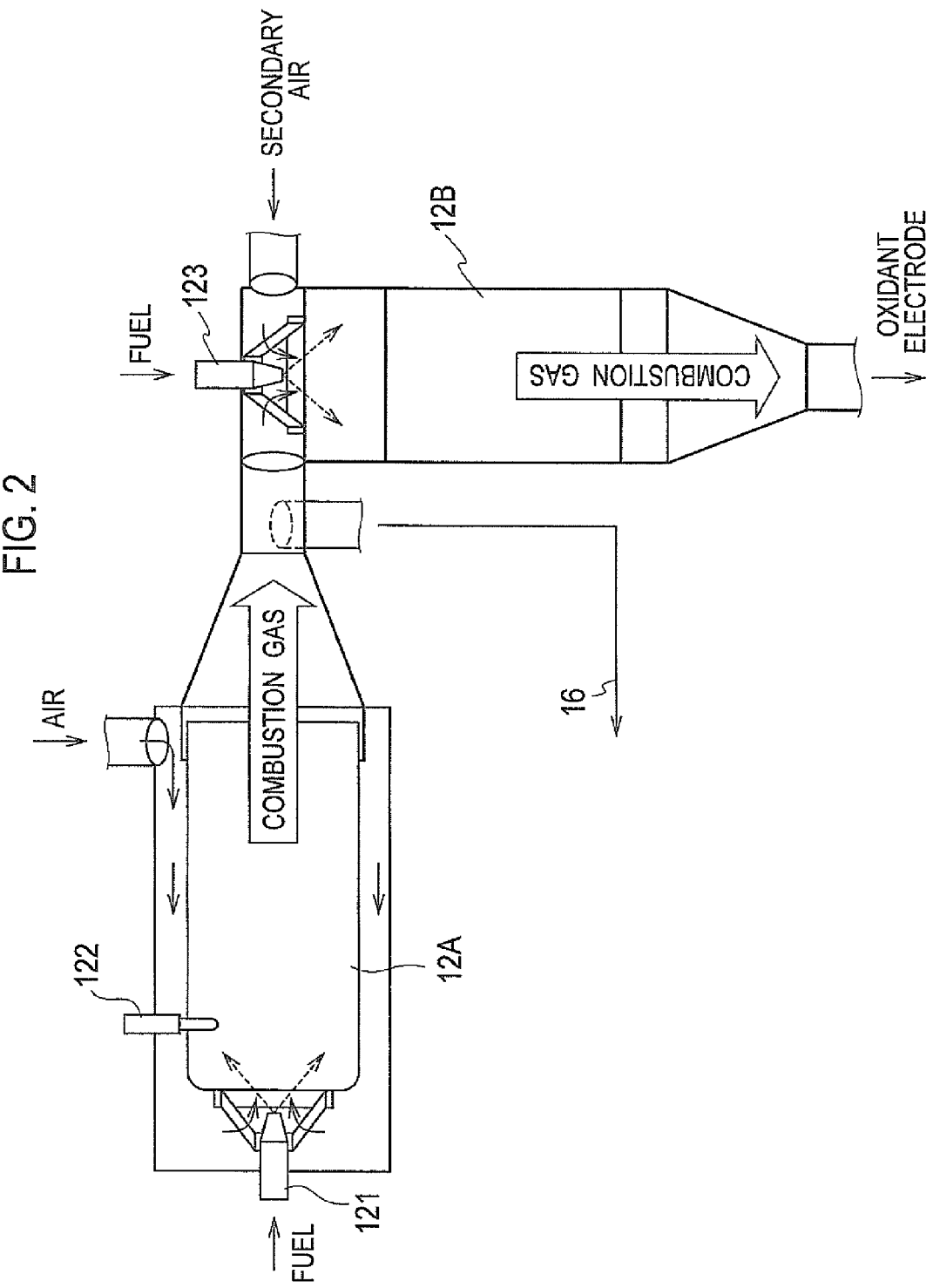
FIG. 2 is a schematic diagram showing a structure of a start burner 12 shown in FIG. 1.

As shown in FIG. 2, the start burner 12 is formed by connecting a primary burner 12A as a pre-burner to a secondary burner 12B as a main burner. The primary burner 12A injects the fuel from a fuel injection valve 121, mixes the fuel with combustion air and ignites the fuel with an ignition device 122, thereby generating the combustion gas. Part of the generated combustion gas is supplied to the combustion gas flow passage 16 and is put into the combustion gas container 17 with the gas pressurizing pump 18. The combustion gas does not contain oxygen but contains an inert gas as its component. In the meantime, the rest of the combustion gas not supplied to the combustion gas flow passage 16 is introduced into the secondary burner 12B. In addition to the combustion gas from the primary burner 12A, the secondary burner 12B receives additional supply of secondary air as well as the fuel through a fuel valve 123, thereby generating a large amount of the combustion gas as a main combustion gas. This combustion gas is supplied to the oxidant electrode 3 and heats the fuel cell stack 4 and the reformer 7.

Although FIG. 2 illustrates the fuel injection using the fuel injection valve 123 as a method of supplying the fuel to the secondary burner 12B, other methods may be also adopted which include the supply of the fuel gas using a fuel vaporizer. Meanwhile, as for a combustion method in the secondary burner 12B, combustion methods may be adopted which include catalytic combustion and lean premixed prevaporized combustion. Here, an appropriate combustion method may be selected on the basis of the composition of the used fuel, exhaust requirements, and the like. FIG. 2 illustrates a diffusive combustion method as the combustion method adopted in the primary burner 12A. Besides, catalytic combustion may be carried out using an electrically heated catalyst or a low temperature active catalyst, depending on temperature conditions of the fuel and the air.

[Procedures for Control Processing When Starting Fuel Cell System] Next, procedures for control processing at the time of starting the solid oxide fuel cell system 1 of the embodiment will be described with reference to a flowchart of FIG. 3.

Figure 3:
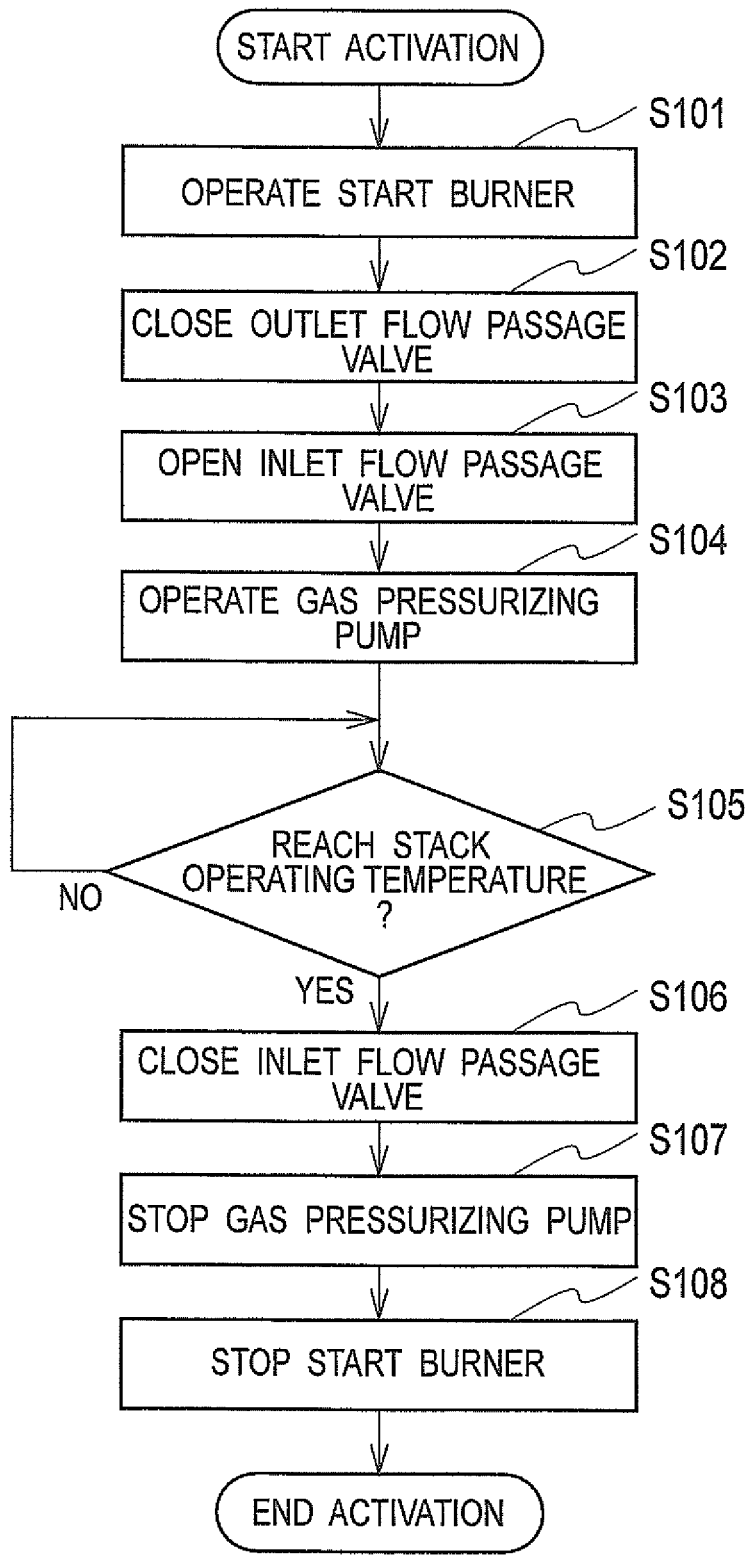
FIG. 3 is a flowchart showing an example of procedures for control processing at the time of starting the system of the solid oxide fuel cell system 1 shown in FIG. 1.

As shown in FIG. 3, when the system is started, the start burner 12 is first operated in step S101 and discharges the combustion gas that contains the inert gas as the component. Part of the combustion gas is supplied to the oxidant electrode 3 to raise the temperature of the fuel cell stack 4, and is then introduced as the oxidant electrode exhaust gas into the heating passage 6 of the reformer 7 and used for heating the reformer 7 as well. In the meantime, the other part of the combustion gas generated by the start burner 12 is discharged to the combustion gas flow passage 16.

Thereafter, the control unit 21 closes the outlet flow passage valve 20 in step S102 and opens the inlet flow passage valve 19 in step S103. Further, the control unit 21 operates the gas pressurizing pump 18 in step S104, whereby the combustion gas discharged from the start burner 12 is pumped and put into the combustion gas container 17.

Next, in step S105, the control unit 21 determines whether or not the temperature of the fuel cell stack 4 reaches an operating temperature. If not, the control unit 21 continues to operate the gas pressurizing pump 18 and keeps on filling the combustion gas into the combustion gas container 17. Then, when the temperature of the fuel cell stack 4 reaches the operating temperature, the control unit 21 closes the inlet flow passage valve 19 in step S106 and stops the gas pressurizing pump 18 in step S107. Hence, the combustion gas containing the inert gas as the component is stored in the combustion gas container 17.

Moreover, the control unit 21 stops the start burner 12 in step S108 to terminate the control processing at the time of starting the system, and then proceeds to control at the time of ordinary power generation.

[Operation of Fuel Cell System at Ordinary Power Generation] Next, an operation of the solid oxide fuel cell system 1 of the embodiment at the time of ordinary power generation will be described. At the time of ordinary power generation by the system, the fuel for reformation is first mixed with the air for reformation from the air supply device 8 and the mixture is supplied to the reformer 7. In the reformation passage 5 of the reformer 7, the reformed gas is generated by reformation reaction, and the generated reformed gas is supplied to the fuel electrode 2 through the fuel electrode flow passage 10. Meanwhile, the air from a not-illustrated compressor is heated by the air preheater 15 and is supplied to the oxidant electrode 3 as the oxidant gas.

Thus, the reformed gas and the oxidant gas are supplied and the fuel cell stack 4 performs power generation. Then, the fuel electrode exhaust gas after the power generation is discharged through the flow passage control valve 11. Meanwhile, the oxidant electrode exhaust gas is mixed with the fuel for heating in the oxidant electrode flow passage 13, and the mixture is supplied to the heating passage 6 of the reformer 7. Here, the mixture generates the reaction heat with the assistance of the heating catalyst and the heat is transferred to the reformation passage 5. Thereafter, the oxidant electrode exhaust gas is discharged from the heating passage 6, then sent to the air preheater 15 through the exhaust flow passage 14, and then discharged to the atmosphere after undergoing heat exchange.

[Procedures for Control Processing When Stopping Fuel Cell System] Next, procedures for control processing at the time of stopping the solid oxide fuel cell system 1 of the embodiment will be described with reference to a flowchart of FIG. 4.

Figure 4:
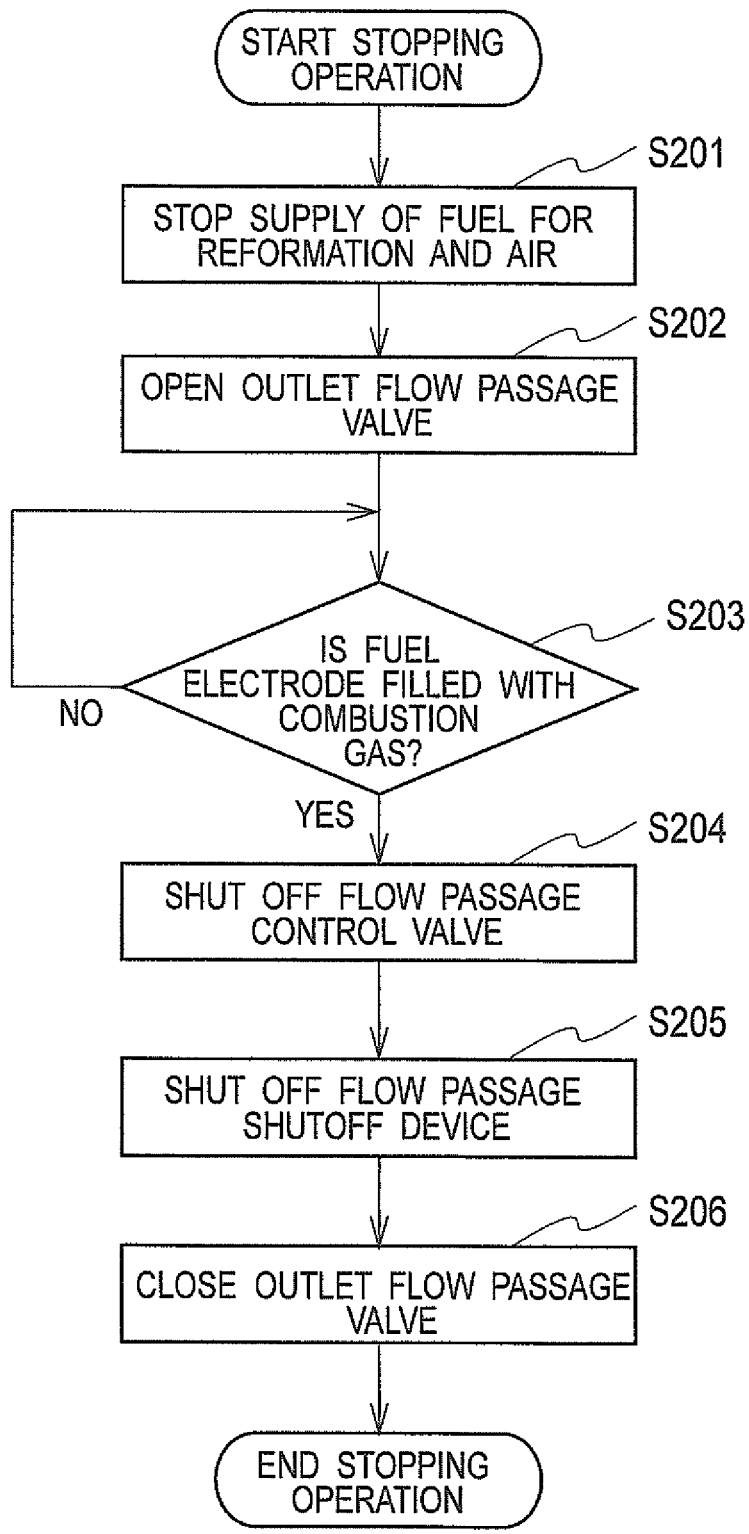
FIG. 4 is a flowchart showing an example of procedures for control processing at the time of stopping the system of the solid oxide fuel cell system 1 shown in FIG. 1.

As shown in FIG. 4, when the system starts a stopping operation, the control unit 21 first stops the fuel for reformation and the air supply device 8 in step S201, and then opens the outlet flow passage valve 20 in step S202. Thus, the combustion gas stored in the combustion gas container 17 at the time of the start is supplied from the reformation passage 5 of the reformer 7 to the fuel electrode 2 through the combustion gas flow passage 16.

Here, the control unit 21 determines in step S203 whether or not the combustion gas is filled into the fuel electrode 2. When it is determined that the combustion gas is filled into the fuel electrode 2, the control unit 21 closes an outlet of the fuel electrode 2 by shutting off the flow passage control valve 11 in step S204, and in step S205, shuts off the flow passage shutoff device 9 provided at an inlet of the reformation passage 5. In this way, the inside of the space extending from the reformation passage 5 to the fuel electrode flow passage 10 and the fuel electrode 2 can be filled with the combustion gas, which is mainly composed of the inert gas and does not contain oxygen. This makes it possible to prevent the entry of oxygen into the fuel electrode 2 and to remove remaining hydrogen from the fuel electrode 2.

Here, the method of determining whether or not the combustion gas is filled into the fuel electrode 2 includes the following examples. Specifically, a time period from the opening of the outlet flow passage valve 20 to the filling of the combustion gas into the fuel cell 2 may be preset on the basis of the capacity of the combustion gas container 17 and the volume of the reformation passage 5 and the fuel electrode 2 in which the combustion gas is to be filled, and then completion of the filling of the combustion gas into the fuel electrode 2 may be determined when the time period passes. As for other alternatives, the completion of the filling of the combustion gas into the fuel electrode 2 may be determined at a point when an internal pressure of the combustion gas container 17 falls below a predetermined pressure, or the completion of the filling of the combustion gas into the fuel electrode 2 may be determined by detecting a pressure in the vicinity of the fuel electrode 2.

After the combustion gas is filled into the fuel electrode 2, the control unit 21 closes the outlet flow passage valve 20 in step S206, and hence terminates the control processing at the time of stopping the system.

Effects of First Embodiment

As described above in detail, according to the solid oxide fuel cell system 1 of the embodiment, the fuel electrode 2 of the fuel cell stack 4 is filled with the inert gas which is discharged from the start burner 12 provided for starting the system. Thus, it is possible to fill the inert gas into the fuel cell and to prevent the entry of oxygen just by providing a small number of the devices in addition to the devices used for power generation at normal times. In addition, hydrogen remaining in the fuel electrode 2 can also be removed by filling the inert gas into the fuel electrode 2. Thereby, it is possible to prevent rapid combustion caused by reaction between the entering oxygen and the remaining hydrogen, and to prevent the catalyst from oxidation or degradation. Thus, stable performances of the fuel cell system can be maintained.

In addition, according to the solid oxide fuel cell system 1 of the embodiment, the combustion gas container 17 contains the combustion gas which is discharged from the start burner 12 at the time of starting the system, and the combustion gas contained in the combustion gas container 17 is filled into the fuel electrode 2 of the fuel cell stack 4 at the time of stopping the system. The inert gas can therefore be filled into the fuel cell by using the start burner 12 provided for starting the system. Thus, it is possible to effectively use the existing device and thereby to prevent the entry of oxygen into the fuel cell stack 4.

Second Embodiment

Next, a solid oxide fuel cell system according to a second embodiment of the present invention will be described.

Figure 5:
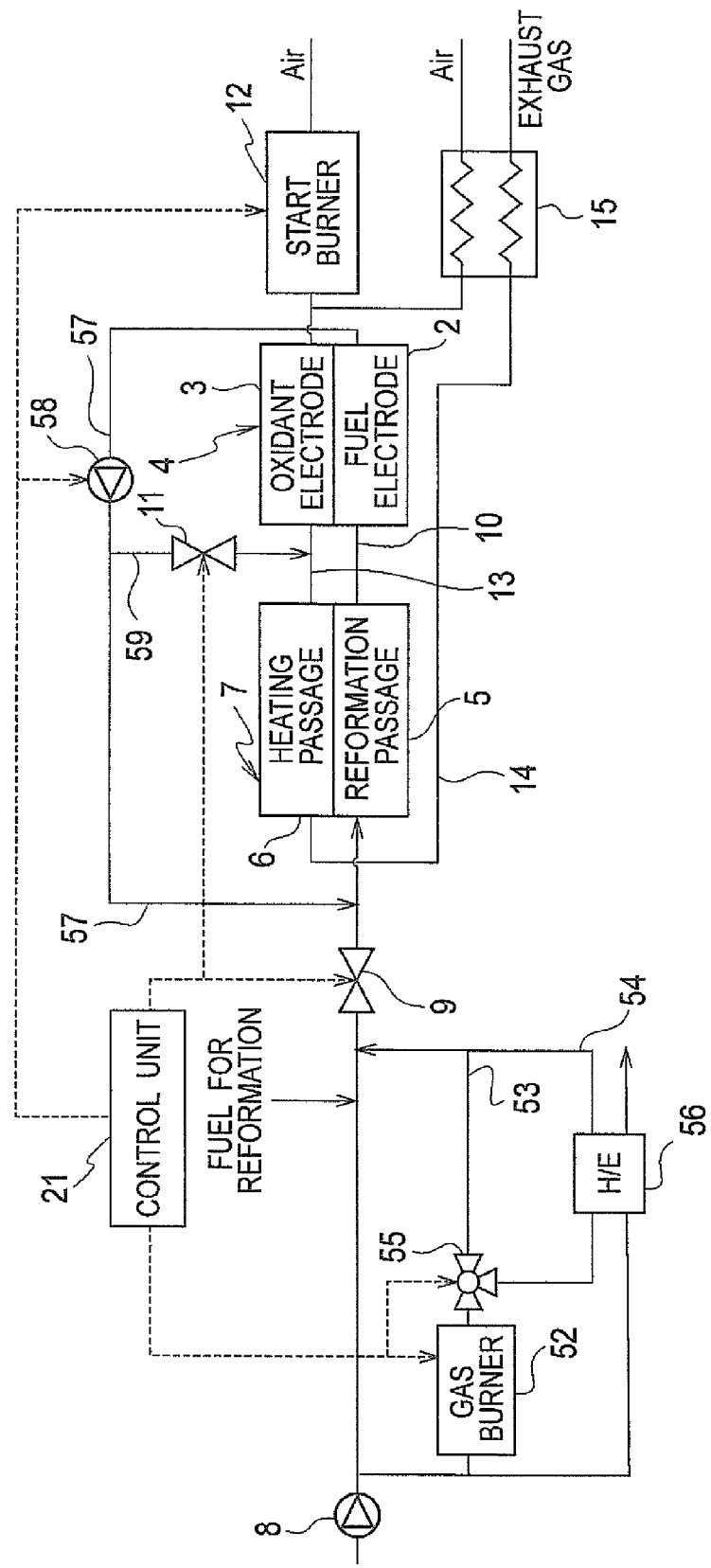
FIG. 5 is a block diagram showing a configuration of a solid oxide fuel cell system 51 according to a second embodiment applying the present invention.

[Configuration of Solid Oxide Fuel Cell System] A configuration of a solid oxide fuel cell system 51 of this embodiment will be described with reference to FIG. 5. The solid oxide fuel cell system 51 of the embodiment is different from the first embodiment in that the solid oxide fuel cell system 51 further includes: a gas burner 52 configured to supply the combustion gas to the fuel electrode 2 at the time of the start; a start flow passage 53 configured to supply a combustion gas discharged from the gas burner 52 to the fuel electrode 2 at the time of starting the system; a stop flow passage 54 configured to supply the combustion gas discharged from the gas burner 52 to the fuel electrode 2 at the time of stopping the system; a flow passage switch valve 55 configured to switch between the start flow passage 53 and the stop flow passage 54; a heat exchanger 56 disposed in the middle of the stop flow passage 54; a circulation gas flow passage 57 configured to circulate the fuel electrode exhaust gas discharged from the fuel electrode 2 to the reformer 7; a circulator 58 disposed in the middle of the circulation gas flow passage 57 and configured to circulate the fuel electrode exhaust gas; and a heating gas flow passage 59 branching off from the circulation gas flow passage 57 and configured to supply part of the fuel electrode exhaust gas as a heating gas for the reformer 7.

This embodiment is also different from the first embodiment in that the combustion gas flow passage 16 of the first embodiment shown in FIG. 1 and the devices disposed in the combustion gas flow passage 16 are not present in this embodiment, and that the flow passage control valve 11 is disposed in the heating gas flow passage 59.

Here, the gas burner 52 is a combustion unit provided for starting the system, which has heretofore been installed in order to supply the combustion gas to the fuel electrode 2 of the fuel cell stack 4 and thereby raise the temperature of the fuel cell 2 at the time of starting the system, and to supply moisture to the fuel cell stack 4 at the same time. Usually, a circulation system including the fuel electrode 2, the circulation gas flow passage 57, and the reformation passage 5 requires the moisture at the time of the start. For this reason, for the purpose of supplying the moisture, it is a conventional practice to burn the fuel by using the gas burner 52 and to supply the combustion gas containing the moisture to the fuel electrode 2. Moreover, in the embodiment, the gas burner 52 provided for the start is also used at the time of the stop and is controlled such that the combustion gas is supplied to the fuel electrode 2. Here, as for the structure of the gas burner 52, it is preferable to adopt a structure similar to that of the primary burner 12A of the start burner 12 shown in FIG. 2.

The heat exchanger 56 removes the moisture from the combustion gas by conducting heat exchange between the combustion gas discharged from the gas burner 52 and the air introduced from the air supply device 8. Thus, the dry combustion gas is filled into the fuel electrode 2 at the time of stopping the system. This makes it possible to prevent condensation of the moisture attributed to a drop in temperature while the system is stopped, and thereby to prevent reduction in the fuel electrode pressure.

[Procedures for Control Processing When Starting Fuel Cell System] Next, procedures for control processing at the time of starting the solid oxide fuel cell system 51 of the embodiment will be described with reference to a flowchart of FIG. 6.

Figure 6:
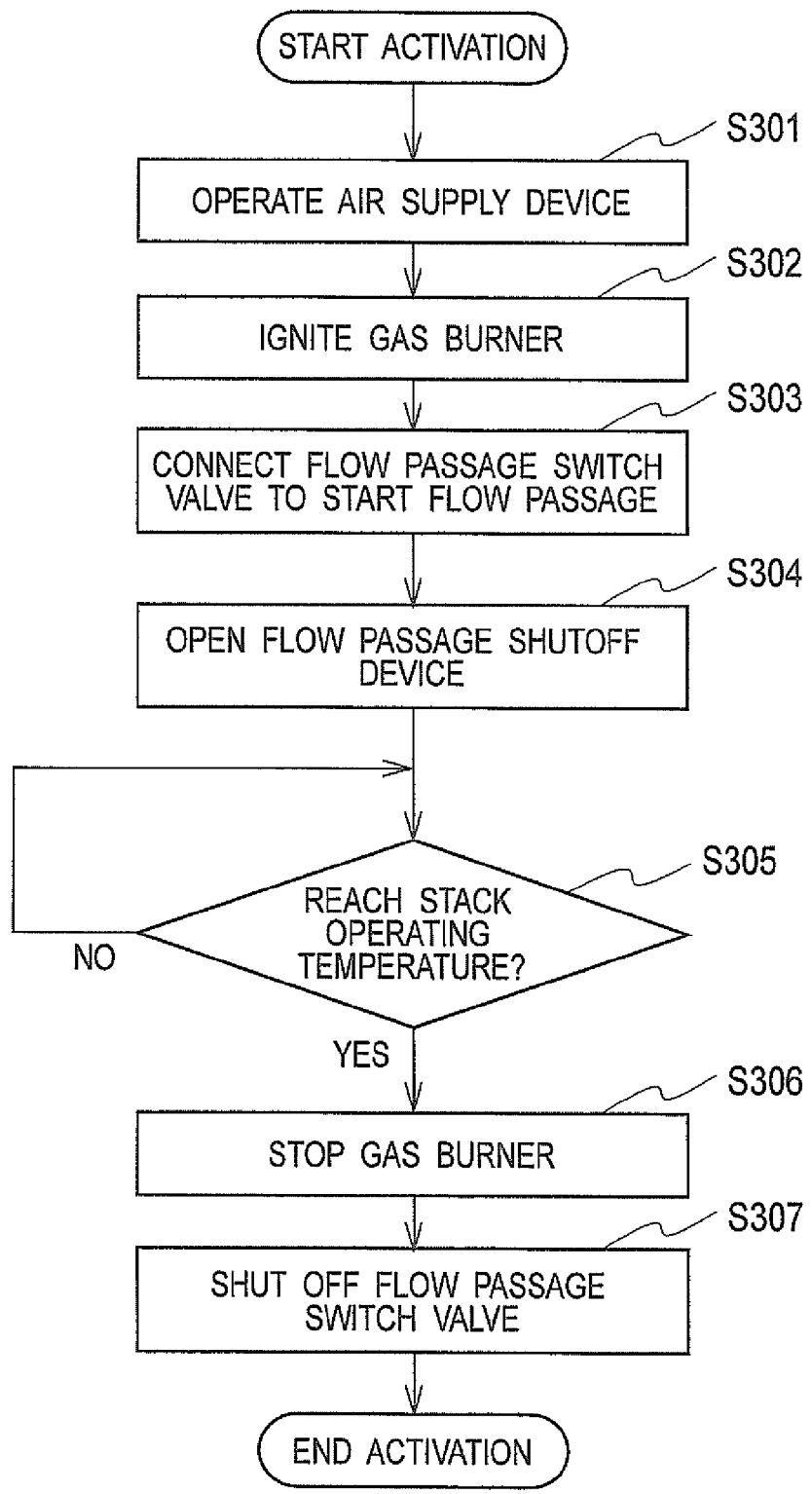
FIG. 6 is a flowchart showing an example of procedures for control processing at the time of starting the system of the solid oxide fuel cell system 51 shown in FIG. 5.

As shown in FIG. 6, when the system is started, the control unit 21 first operates the air supply device 8 and starts supply of the air to the gas burner 52 in step S301, and ignites the gas burner 52 in step S302. When the discharge of the combustion gas mainly composed of the inert gas not containing oxygen is started by the ignition of the gas burner 52, the control unit 21 connects the flow passage switch valve 55 to the start flow passage 53 in step S303, and opens the flow passage shutoff device 9 and supplies the combustion gas to the fuel electrode 2 in step S304.

Meanwhile, the start burner 12 is supplying the combustion gas for heating to the oxidant electrode 3 at the same time. Accordingly, the temperature of the fuel cell stack 4 rises. In addition, the combustion gas is introduced as the oxidant electrode exhaust gas into the heating passage 6 of the reformer 7. As a consequence, the temperature of the reformer 7 is raised as well.

Thereafter, in step S305, the control unit 21 determines whether or not the temperature of the fuel cell stack 4 reaches the operating temperature. When the fuel cell stack 4 reaches the operating temperature, the control unit 21 stops the gas burner 52 in step S306. At this time, the control unit 21 also stops the start burner 12 simultaneously.

Then, in step S307, the control unit 21 shuts off the flow passage switch valve 55 to terminate the control processing at the time of starting the system, and then proceeds to the control at the time of ordinary power generation.

[Operation of Fuel Cell System at Ordinary Power Generation] Next, an operation of the solid oxide fuel cell system 51 of the embodiment at the time of ordinary power generation will be described. It is to be noted, however, that the operation before the power generation takes place is the same as that in the first embodiment whereas only the flow of the fuel electrode exhaust gas is different from that of the first embodiment. The following description will therefore be given only of the flow of the fuel electrode exhaust gas.

When the fuel cell stack 4 performs the power generation, the fuel electrode exhaust gas is discharged from the fuel electrode 2 to the circulation gas flow passage 57, and is then pumped by the circulator 58 and circulated to the reformation passage 5 of the reformer 7. At this time, part of the fuel electrode exhaust gas is branched off and introduced into the heating gas flow passage 59, and is then mixed with the oxidant electrode exhaust gas discharged from the oxidant electrode 3. The mixture is supplied to the heating passage 6 of the reformer 7 as the heating gas.

The above-described first embodiment shows the example of the case where neither the circulation gas flow passage 57 nor the heating gas flow passage 59 is disposed therein. Nevertheless, the circulation gas flow passage 57 and the heating gas flow passage 59 may be disposed in the first embodiment.

[Procedures for Control Processing When Stopping Fuel Cell System] Next, procedures for control processing at the time of stopping the solid oxide fuel cell system 51 of the embodiment will be described with reference to a flowchart of FIG. 7.

As shown in FIG. 7, when the system starts a stopping operation, the control unit 21 first stops the supply of the fuel for reformation in step S401, and ignites the gas burner 52 in step S402. When the discharge of the combustion gas mainly composed of the inert gas not containing oxygen is started by the ignition of the gas burner 52, the control unit 21 connects the flow passage switch valve 55 to the stop flow passage 54 in step S403, and supplies the combustion gas to the fuel electrode 2 through the heat exchanger 56. At this time, the heat exchanger 56 controls the temperature of the combustion gas and thereby reduces an amount of water vapor therein. As a consequence, the dry combustion gas is supplied to the fuel electrode 2.

Thereafter, the control unit 21 determines in step S404 whether or not the combustion gas is filled into the fuel electrode 2. When it is determined that the combustion gas is filled into the fuel electrode 2, the control unit 21 stops the gas burner 52 in step S405.

As for the method of determining whether or not the combustion gas is filled into the fuel electrode 2, the determination may be made on the basis of a time period after the ignition of the gas burner 52, or by detecting a composition (such as a hydrogen concentration or a dew-point temperature) of the gas in the circulation gas passage 57 and on the basis of the composition.

Thereafter, the control unit 21 shuts off the flow passage shutoff device 9 provided at the inlet of the reformation passage 5 in step S406, and then shuts off the flow passage control valve 11 and closes the outlet of the fuel electrode 2 in step S407. In this way, the inside of the space extending from the reformation passage 5 to the fuel electrode flow passage 10, the fuel electrode 2, and the circulation gas flow passage 57 can be filled with the combustion gas, which is mainly composed of the inert gas and does not contain oxygen. This makes it possible to prevent the entry of oxygen into the fuel electrode 2, and to remove remaining hydrogen from the fuel electrode 2.

When the combustion gas is filled into the fuel electrode 2 as described above, the control unit 21 stops the circulator 58 in step S408, and hence terminates the control processing at the time of stopping the system.

Effects of Second Embodiment

As described above in detail, the solid oxide fuel cell system 51 of the embodiment includes the gas burner 52 configured to supply the combustion gas to the fuel electrode 2, and fills the combustion gas into the fuel electrode 2 by operating the gas burner 52 at the time of stopping the system. Thus, the inert gas can be filled into the fuel cell by using the gas burner 52 provided for starting the system. Thus, it is possible to effectively use the existing device and thereby to prevent the entry of oxygen into the fuel cell stack 4.

Moreover, the solid oxide fuel cell system 51 of the embodiment includes: the start flow passage 53 which supplies the combustion gas discharged from the gas burner 52 to the fuel electrode 2 at the time of starting the system; the stop flow passage 54 which supplies the combustion gas discharged from the gas burner 52 to the fuel electrode 2 at the time of stopping the system; and the heat exchanger 56 disposed in the middle of the stop flow passage 54. Here, the start flow passage 53 is selected at the time of starting the system and the stop flow passage 54 is selected at the time of stopping the system. As a consequence, the combustion gas discharged from the gas burner 52, which contains the moisture, can be supplied to the fuel electrode 2 at the time of the start. Meanwhile, the combustion gas from which the moisture is removed by the heat exchanger 56 can be supplied to the fuel electrode 2 at the time of the stop.

Furthermore, the solid oxide fuel cell system 51 of the embodiment includes: the reformer 7 which reforms the fuel gas into the reformed gas and to supply the reformed gas to the fuel electrode 2; the circulation gas flow passage 57 which circulates the fuel electrode exhaust gas discharged from the fuel electrode 2 to the reformer 7; and the heating gas flow passage 59 which mixes part of the fuel electrode exhaust gas branched off from the circulation gas flow passage 57 with the oxidant electrode exhaust gas discharged from the oxidant electrode 3 and supplies the mixture as the heating gas for the reformer 7. It is therefore possible to reuse the exhaust gas discharged from the fuel electrode 2 and containing hydrogen and water vapor, and thus to improve efficiency of the system.

While the contents of the present invention have been described above with reference to certain embodiments, it is obvious to those skilled in the art that the invention are not limited only to the above descriptions and various modifications and improvements are possible.

According to the solid oxide fuel cell system and the method for controlling the same of any of the embodiments of the present invention, the inert gas discharged from the combustion unit provided for starting the system is filled into the fuel electrode of the fuel cell stack. Thus, it is possible to fill the inert gas into the fuel cell and to prevent the entry of oxygen just by providing a small number of the devices in addition to the devices used for power generation at normal times. In addition, hydrogen remaining in the fuel electrode can also be removed by filling the inert gas into the fuel electrode. Thereby, it is possible to prevent rapid combustion caused by reaction between the entering oxygen and the remaining hydrogen, and to prevent the catalyst from oxidation or degradation. Thus, stable performances of the fuel cell system can be maintained. The present invention is therefore industrially applicable.

The invention claimed is:

1. A solid oxide fuel cell system comprising:
a fuel cell stack including a fuel electrode and an oxidant electrode;
a reformer configured to reform a fuel gas into a reformed gas and to supply the reformed gas to the fuel electrode of the fuel cell stack;
a combustion unit provided to start the system and configured to supply a combustion gas to the oxidant electrode of the fuel cell stack, the combustion gas containing an inert gas as a component;
a combustion gas flow passage configured to supply part of the combustion gas discharged from the combustion unit to the fuel electrode of the fuel cell stack;
a combustion gas container disposed in the middle of the combustion gas flow passage and configured to contain the combustion gas; and
a control unit programmed to:
supply part of the combustion gas discharged from the combustion unit to the oxidant electrode of the fuel cell stack and cause the combustion gas container to contain the other part of the combustion gas discharged from the combustion unit at the time of starting the system, and
control in such a way as to fill the combustion gas contained in the combustion gas container into the fuel electrode of the fuel cell stack at the time of stopping the system.

2. A solid oxide fuel cell system comprising:
a fuel cell stack including a fuel electrode and an oxidant electrode;
a combustion unit provided to start the system and configured to supply a combustion gas to the fuel electrode of the fuel cell stack, the combustion gas containing an inert gas as a component;
a start flow passage configured to supply the combustion gas discharged from the combustion unit to the fuel electrode of the fuel cell stack at the time of starting the system;
a stop flow passage configured to supply the combustion gas discharged from the combustion unit to the fuel electrode of the fuel cell stack at the time of stopping the system;
a heat exchanger disposed in the middle of the stop flow passage; and
a control unit programmed to select the start flow passage at the time of starting the system and to select the stop flow passage and operate the combustion unit to fill the combustion gas into the fuel electrode of the fuel cell stack at the time of stopping the system;

wherein based on a determination by the control unit that the combustion gas is filled into the fuel electrode of the fuel cell stack at the time of stopping the system, the control unit closes an inlet and an outlet of the fuel electrode of the fuel cell stack.

3. The solid oxide fuel cell system according to claim 1, further comprising:
- a circulation gas flow passage configured to circulate a fuel electrode exhaust gas discharged from the fuel electrode of the fuel cell stack to the reformer; and
- a heating gas flow passage configured to mix part of the fuel electrode exhaust gas branched off from the circulation gas flow passage with an oxidant electrode exhaust gas discharged from the oxidant electrode of the fuel cell stack, and to supply the mixture as a heating gas for the reformer.

4. A method for controlling a solid oxide fuel cell system, the system being provided with a fuel cell stack having a fuel electrode and an oxidant electrode, a combustion unit provided to start the system, and a control unit to control the system, the method comprising:
- supplying part of a combustion gas discharged from the combustion unit into the oxidant electrode of the fuel cell stack and causing a combustion gas container to contain the other part of the combustion gas discharged from the combustion unit at the time of starting the system, the combustion gas containing an inert gas as a component; and
- filling the combustion gas contained in the combustion gas container into the fuel electrode of the fuel cell stack at a time of stopping the system.

* * * * *